April 14, 1970  F. MASSA  3,506,954
PASSIVE SONIC LOCATING SYSTEM
Filed April 20, 1967
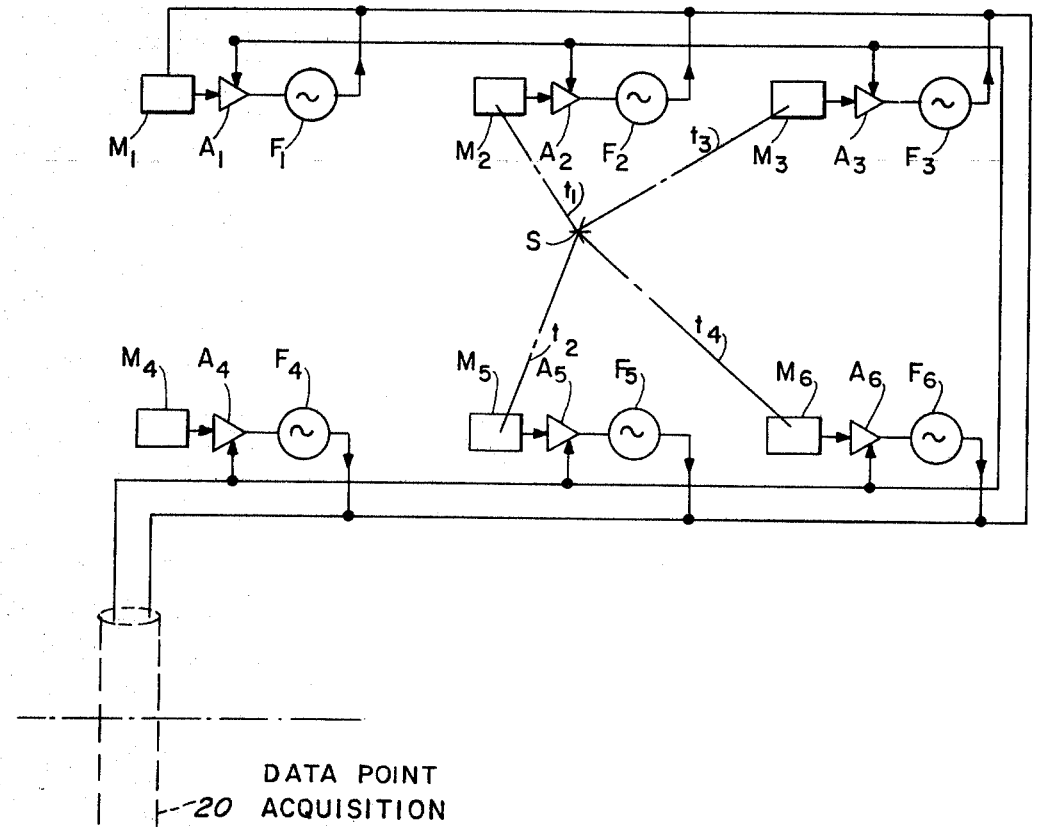
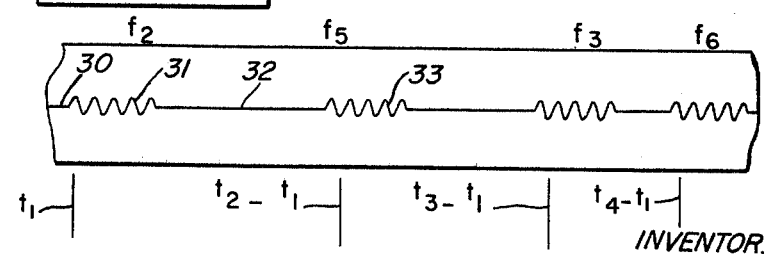
INVENTOR.
FRANK MASSA 3,506,954
Patented Apr. 14, 1970

3,506,954
PASSIVE SONIC LOCATING SYSTEM
Frank Massa, Cohasset, Mass., assignor to Massa Division, Dynamics Corporation of America, Hingham, Mass.
Filed Apr. 20, 1967, Ser. No. 632,231
Int. Cl. G01s 3/00, 5/18
U.S. Cl. 340—6                                    10 Claims

ABSTRACT OF THE DISCLOSURE

A single submarine cable interconnects a group of transponders which are scattered across an ocean floor. Each transponder includes a hydrophone, a preamplifier, and an oscillator tuned to a particular location identifying frequency. When an object splashes down into the ocean, the nearby hydrophones pick up the resulting disturbances in the water and each oscillator sends a frequency signal identifying the reporting hydrophone. The time of arrival of each signal gives a distance indication of the point of splash-down.

---

This invention relates to sonic locating systems and more particularly to passive systems for use under the surface of the ocean.

An exemplary passive system of the described type is anchored to the bottom of the ocean and used to indicate the point of impact where an object splashes down on the surface of the ocean. The nature of the object striking the ocean surface and all matters relating thereto, are irrelevant to the invention except that the object must produce sonic waves in the ocean which exceed a predetermined power level.

A basic system of the described type provides an array of hydrophones which are bottom mounted at predetermined locations and joined together by submarine cables which are very expensive. Heretofore, the cable system has been complex, requiring an independent cable extending between each hydrophone position and a data acquisition point.

Accordingly, an object of this invention is to simplify the cable system and reduce the amount of submarine cabling required by a passive sonic locating system. Here, an object is to use a single cable for all hydrophones in an entire system.

Another object is to provide a number of hydrophones which positively identify themselves to the monitoring equipment at a data acquisition point. In this connection, an object is to return a signal representing both the identity of and the distance between the reporting hydrophone and a splash-down point.

Yet another object is to provide a passive sonic locating system requiring a minimum amount of underwater electronic equipment which, nevertheless, substitutes such electronic equipment for the more expensive cable which was used heretofore.

In keeping with an aspect of the invention, these and other objects are accomplished by means of a single submarine cable running between the data acquisition point and every one of the underwater hydrophone positions. Each position includes an oscillator for returning a tone signal having a frequency which identifies both the position that is reporting and the distance between the reporting and splash-down. However, the total amount of electronic equipment located at any underwater position is restricted so that all power required by the entire system may be furnished via a common conductor in the cable.

The equipment for accomplishing these and other objects will be understood best by reference to the attached drawing, in which:

FIG. 1 is a schematic circuit diagram illustrating a group of transponders arranged in a predetermined geometrical pattern and interconnected by a single submarine cable; and FIG. 2 is a graphical representation of an oscillogram of data which might be returned from the transponder over the submarine cable to the data acquisition point.

Briefly, FIG. 1 shows a submarine cable 20 extending from a common source of D.C. potential 22 to an array of six transponders anchored to the bottom of the ocean by any suitable means (not shown). Of course, the number six is not critical, any number of transponders may be provided. As here shown, all of the transponders are fed power over a common wire 24. The return connection to the power source 22 may be completed via either a common ground or an extra wire (not shown).

Each transponder includes a hydrophone M, a preamplifier A, and an oscillator or other source of frequencies F. The hydrophones (M1, M2, . . . M6) are suitable devices for picking up underwater sound and converting it into electrical signals. Individually associated with each hydrophone is an oscillator or other source of audio frequencies (F1, F2, . . . F6), and a preamplifier (A1, A2, . . . A6). Each oscillator has an output coupled to a common conductor 26 in the submarine cable which, in turn, extends to an A.F. signal recorder 27 which may be a tape recorder or other means for making an oscillogram.

During normal background noise or quiescent conditions, the noise picked up from the water produces a low level of signal at the output of each hydrophone M. Therefore, the signal at the output of the preamplifier A also has a low power level, well below the level necessary to trigger the audio source F into oscillation. Hence, the quiescent recording at the tape recorder or the trace of the oscillogram is a relatively unvarying base line, as at 30.

When a heavy or fast moving object strikes the surface of the ocean water, there is a sonic disturbance in the water which exceeds the background noise with a predetermined magnitude. This sonic disturbance travels outwardly from the point of impact at the speed of sound in the water where splash-down occurs. When the disturbance passes over the transponders, the output power shoots up at one or more of the hydrophone elements M near the point of splash-down. This high power output is amplified at A, and the amplified signal is then fed into the audio source F. The source is triggered into oscillation, and an audio tone signal is sent over wire 26 in the submarine cable. The magnetic recorder or oscillograph 27 records a signal which may later be identified both as to frequency and time of occurrence. An example of such a recording is shown graphically in FIG. 2 where base line 30 represents the background noise, and the oscillations 31 represent the sound received from an oscillator.

As a specific illustration of the operation of the acoustic locating system, assume that impact is made by an object splashing down at the point S. As FIG. 1 is drawn, the point S is closest to hydrophone M2, and successively further removed from the hydrophones M5, M3, and M6. An assumption is that splash-down is too far from hydrophones M1 and M4 to cause any significant results. Thus, the sound wave from the splash-down point S arrives at the hydrophone M2 at a time $t1$. The same sound wave is picked up by hydrophone M5 at time $t2$, at hydrophone M3 at time $t3$, and at hydrophone M6 at time $t4$. When the sound is pickup up, it is amplified by the preamplifiers A2, A5, A3, and A6, respectively. Each time a signal source F breaks into oscillation, a signal in the form of a burst of a tone of the indicated frequency is transmitted along the signal lead 26 to the recorder 27. This burst may have any suitable duration fixed by the electronic circuitry; it only needs to persist long enough for the frequency of the tone to be identified accurately.

Thus, FIG. 2 has been drawn to indicate a base line 30 generated by background noise occurring before splash-down. At time $t1$, the first tone signal indicating detection of the sound wave is sent from the transponder 2, and over line 26 to the recorder 27 where it is recorded as oscillogram 31. At time $t2-t1$, the sound wave reaching transponder 5 causes a tone signal to be sent over the line 26 at the frequency $f5$ and recorded as oscillogram 33. In like manner, oscillograms of frequencies $f3$ and $f6$ are recorded at times $t3-t1$ and $t4-t1$.

Since each oscillator has a unique frequency, the frequency of the oscillogram may be read to ascertain the identity of the hydrophone making the report. The time intervals $t1$, $t2$, $t3$, and $t4$ occurring between splash-down and the detections of the sonic disturbance at the various transponders are proportional to the distance in the ocean between the transponder and splash-down and the indicated distances along the length of the tape in FIG. 2. Thus, the tape of FIG. 2 may have a scale printed thereon which may be read directly in terms of distance through the ocean.

An advantage of the inventive system is that a large number of hydrophones may be employed in a target area for giving a greatly increased reliability of operation under adverse sea conditions without running into the enormous cost normally required when separate and individual cables are provided for each hydrophone position.

If the electrical audio frequency signals which are triggered off by the amplified acoustic signal are in the general range of one kHz., to two kHz. the time resolution between recorded frequency pulses is in the order of 1 millisecond. This means an accuracy of the order of 5 ft. in the resolution of the vector distances between the splash-down point and the several hydrophones. The basic idea is, then, to employ a single cable connected to a multiple hydrophone array in a system for the localization of an acoustic signal which, for example, might be the point of impact of an object hitting the water. Each hydrophone in the multiple array includes a local audio oscillator tuned to a different frequency so that the arrival of successive signals at the recorder automatically identifies the particular hydrophones which were activated by the source of sound. The difference between the successive times of arrival of the signals from a few of the first reporting hydrophones is a measure of the location of the point of impact.

While the invention has been disclosed in connection with a specific embodiment of the invention, the appended claims are not to be restricted thereto. Quite the contrary, they are to be construed broadly enough to cover the entire range of equivalents falling within the true spirit and scope of the invention.

I claim:

1. An underwater passive sonic location detection system comprising a plurality of transponders for converting underwater sound signals into electrical signals, a central station having a data acquisition point thereat, a single submarine cable running serially through a number of said transponders at scattered locations in said water to said data acquisition point at said central station, each of said transponders comprising equipment including a hydrophone and a distinctive source of a given frequency individually identifying the corresponding transponder locations, signal responsive means at said central station data acquisition point, and means responsive to a high energy disturbance in said water for causing at least some of said transponders to transmit a momentary burst of tone signals identifying the transmitting transponders over said cable to said signal responsive means at said central station data acquisition point, whereby each of said transponders transmits an identifying tone over said cable at a time established by the speed of sound in the water and the distance between the location of the disturbance and the transmitting transponders.

2. The system of claim 1 and an amplifier at each transponder location, said hydrophones being connected to drive the associated amplifiers which are in turn connected to trigger said source of frequencies into oscillation, the background water noise causing a signal level at the output of said amplifier which is not adequate to trigger said oscillations, and said disturbance causing a signal level at the output of said amplifier which is adequate to trigger said oscillations.

3. The system of claim 1 wherein said signal responsive means comprises means at said central station data acquisition point for recording each of said momentary tone signals in terms of the time of receipt of and the frequency of the recorded tone.

4. The system of claim 1 and means comprising a source of power for energizing said equipment at each transponder, and means for feeding power from said source over said cable to each of said transponders.

5. The system of claim 1 and means comprising a common conductor in said cable connected between each of said frequency sources and said central station data acquisition point whereby the momentary tone signals from all of the transponders arrive at a single point via said common conductor, and said signal responsive means comprises means coupled to said cable at said central station data acquisition point for recording the time of arrival and the frequency of each of the momentary burst of tone signals.

6. An electroacoustic system for the location of an object which initiates a burst of sound energy at the point where the object is located, said system comprising a number of sound sensors, means at each sensor for emitting a momentary burst of electrical audio frequency signal characterizing and uniquely identifying the associated sound sensor, common electrical transmission means connected to each of said audio frequency signal means, and means for momentarily activating said audio frequency signal source at any of said sensors when the burst of sound energy reaches that particular sensor.

7. The invention set forth in claim 6 and means for recording the momentary burst of audio signals generated responsive to each sensor in time sequence synchronized with the times of arrival of the burst of sound energy at responding sensors.

8. A system for the location of the impact point of an object splashing down in an ocean within a defined target area comprising an array of submerged hydrophones located in fixed positions over the target area, each hydrophone including an associated electronic circuit means comprising an amplifier and an audio frequency signal source, each signal source being tuned to a different frequency for individually identifying each of said hydrophone locations, and means for momentarily activating said signal source to produce a tone burst when the associated amplifier output level increases to a predetermined level responsive to the arrival of a sound signal of greater intensity than the prevailing threshold noise level in the water.

9. The invention of claim 8 and signal responsive means, a central station having said signal responsive means thereat, a single submarine cable, means comprising said cable for connecting a multiplicity of said audio signal sources to said signal responsive means.

10. The invention of claim 9 wherein said signal responsive means comprises an audio frequency recorder connected to the cable for recording the frequency of received audio signals along a time spaced scale.

References Cited

UNITED STATES PATENTS

| 1,905,315 | 4/1933 | Stephenson | 340—6 X |
| 3,116,471 | 12/1963 | Coop | 340—2 |
| 3,132,330 | 5/1964 | Donner. | |
| 3,159,807 | 12/1964 | Asbury | 340—6 |

RICHARD A. FARLEY, Primary Examiner